(12) United States Patent
Yehezkely (10) Patent No.: US 12,199,336 B2
(45) Date of Patent: Jan. 14, 2025

(54) MULTI-BAND ENERGY HARVESTING SYSTEM

(71) Applicant: Wiliot, Ltd., Caesarea (IL)

(72) Inventor: Alon Yehezkely, Haifa (IL)

(73) Assignee: Wiliot, Ltd., Caesarea (IL)

( * ) Notice: Subject to any disclaimer, the term of this patent is extended or adjusted under 35 U.S.C. 154(b) by 17 days.

(21) Appl. No.: 17/337,013

(22) Filed: Jun. 2, 2021

(65) Prior Publication Data
US 2021/0288395 A1    Sep. 16, 2021

Related U.S. Application Data

(63) Continuation of application No. 16/356,618, filed on Mar. 18, 2019, now Pat. No. 11,038,262.

(60) Provisional application No. 62/792,581, filed on Jan. 15, 2019.

(51) Int. Cl.
| | |
|---|---|
| *H01Q 1/24* | (2006.01) |
| *H01Q 23/00* | (2006.01) |
| *H02J 7/02* | (2016.01) |
| *H02J 50/00* | (2016.01) |
| *H02J 50/20* | (2016.01) |
| *H02J 50/40* | (2016.01) |
| *H04W 4/80* | (2018.01) |

(52) U.S. Cl.
CPC .............. *H01Q 1/248* (2013.01); *H02J 7/02* (2013.01); *H02J 50/001* (2020.01); *H02J 50/005* (2020.01); *H02J 50/20* (2016.02); *H02J 50/402* (2020.01); *H04W 4/80* (2018.02); *H01Q 23/00* (2013.01)

(58) Field of Classification Search
CPC ...... H01Q 1/248; H01Q 1/2291; H01Q 1/241; H01Q 5/307; H01Q 21/28; H01Q 23/00; H02J 7/02; H02J 7/022; H02J 50/001; H02J 50/005; H02J 50/20; H02J 50/23; H02J 50/402; H04W 4/40; H04W 4/70; H04W 4/80
See application file for complete search history.

(56) References Cited

U.S. PATENT DOCUMENTS

| | | | |
|---|---|---|---|
| 9,680,326 B2 * | 6/2017 | Van Der Lee | .......... H02J 50/40 |
| 10,205,084 B2 | 2/2019 | Vaidya et al. | |
| 10,238,872 B2 | 3/2019 | Pivonka et al. | |
| 11,398,144 B2 * | 7/2022 | Shakedd | ............ G08B 13/2457 |

(Continued)

FOREIGN PATENT DOCUMENTS

WO    2017146371 A3    8/2018

OTHER PUBLICATIONS

Kang, et al., Bootstrapped Rectifier—Antenna Co-Integration for Increased Sensitivity in Wirelessly-Powered Sensors, 2018, IEEE, pp. 1-11.

(Continued)

*Primary Examiner* — Raymond R Chai
(74) *Attorney, Agent, or Firm* — M&B IP Analysts, LLC (57) ABSTRACT

A multi-band energy harvesting system is provided. The system includes a plurality of harvesting antennas, wherein each of the plurality of harvesting antennas, operates a specific frequency band; and a plurality of harvesting units, wherein each of the plurality of harvesting units is coupled to a respective harvesting antenna and adapted to harvest energy at the specific frequency band of the respective harvesting antenna.

19 Claims, 5 Drawing Sheets

(56) References Cited

U.S. PATENT DOCUMENTS

| | | | |
|---|---|---|---|
| 2006/0281435 A1 | 12/2006 | Shearer et al. | |
| 2007/0109121 A1* | 5/2007 | Cohen | H04Q 9/00 |
| | | | 340/693.1 |
| 2010/0244576 A1* | 9/2010 | Hillan | G06K 7/0008 |
| | | | 343/745 |
| 2012/0256492 A1* | 10/2012 | Song | H02J 1/102 |
| | | | 307/64 |
| 2013/0113299 A1* | 5/2013 | Von Novak | H02J 50/40 |
| | | | 307/104 |
| 2013/0257219 A1 | 10/2013 | Monfray et al. | |
| 2014/0184152 A1* | 7/2014 | Van Der Lee | H02J 50/40 |
| | | | 320/108 |
| 2015/0236551 A1 | 8/2015 | Shearer et al. | |
| 2015/0256097 A1 | 9/2015 | Gudan et al. | |
| 2015/0324681 A1 | 11/2015 | Mats et al. | |
| 2016/0049823 A1 | 2/2016 | Stein et al. | |
| 2017/0046933 A1 | 2/2017 | Stewart et al. | |
| 2017/0279276 A1* | 9/2017 | Amin | H02J 7/35 |
| 2018/0139698 A1 | 5/2018 | Quinlan et al. | |
| 2018/0152091 A1 | 5/2018 | Donnelly et al. | |
| 2018/0183274 A1* | 6/2018 | Auten | H04B 5/72 |
| 2018/0283913 A1 | 10/2018 | Chen et al. | |
| 2019/0013690 A1* | 1/2019 | Chen | H02J 7/34 |
| 2019/0252924 A1* | 8/2019 | Bito | H04B 1/1607 |
| 2021/0328459 A1* | 10/2021 | Becker | H01Q 1/38 |
| 2023/0009928 A1* | 1/2023 | Rokhsaz | B60C 23/0474 |

OTHER PUBLICATIONS

Lee, et al., A 635pW Battery Voltage Supervisory Circuit for Miniature Sensor Nodes, University of Michigan, Ann Arbor, MI., 2012, IEEE, pp. 202-203.

The International Search Report and The Written Opinion for PCT/US2019/058281 of the International Searching Authority, Date of Mailing: Feb. 6, 2020, ISA/RU, Moscow, Russia.

Kim et al., "High-efficiency voltage regulation stage in energy harvesting systems", IFIP/IEEE International Conference on Very Large Scale Integration (VLSI-SOC), Nov. 2, 2015.

Shrestha et al., "Comparative Study of Antenna Designs for RF Energy Harvesting", Hindawi Publishing Corporation: International Journal of Antennas and Propagation, vol. 2013, Article ID: 385260.

The extended European Search Report for European Application No. 19910587.5, European Patent Office, Munich, Germany, Dated: Sep. 12, 2022.

Zhang et al., "MIMO Broadcasting for Simultaneous Wireless Information and Power Transfer", IEEE Transactions on Wireless Communications, vol. 12, No. 5, May 2013.

* cited by examiner

MULTI-BAND ENERGY HARVESTING SYSTEM

CROSS REFERENCE TO RELATED APPLICATIONS

This application is continuation of U.S. application Ser. No. 16/356,618 filed on Mar. 18, 2019, now allowed, which claims the benefit of U.S. Provisional Application No. 62/792,581 filed on Jan. 15, 2019, the contents of which are hereby incorporated by reference.

TECHNICAL FIELD

The present disclosure relates generally to energy harvesting and more specifically to Internet of Things (IoT) sensors.

BACKGROUND

The Internet of things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond machine-to-machine (M2M) communications and covers a variety of protocols, domains, and applications.

IoT can be encapsulated in a wide variety of devices, such as heart monitoring implants; biochip transponders on farm animals; automobiles with built-in sensors; automation of lighting, heating, ventilation, air conditioning (HVAC) systems; and appliances such as washer/dryers, robotic vacuums, air purifiers, ovens or refrigerators/freezers that use Wi-Fi for remote monitoring. Typically, IoT devices encapsulate wireless sensors or a network of such sensors.

Most IoT devices are wireless devices that collect data and transmit such data to a central controller. There are a few requirements that must be met to allow widespread deployment of IoT devices. Such requirements include reliable communication links, low energy consumption, and low maintenance costs.

An alternative to using batteries, is a power supply which may be harvested from sources such as light, movement, and electromagnetic power such as existing radio frequency transmissions. The harvested power is stored in a capacitor or a rechargeable battery, and typically managed by a power management unit (PMU). A PMU is a circuit that performs general circuit power related operations, such as supply regulation, voltage and current references, power on indication, brown-out indication, power modes control, management of power storage units, and more.

Specifically, in power harvesting systems, a PMU provides energy storage and voltage threshold crossing indications based on measurement of the voltage over the storage capacitors.

Figure 1:
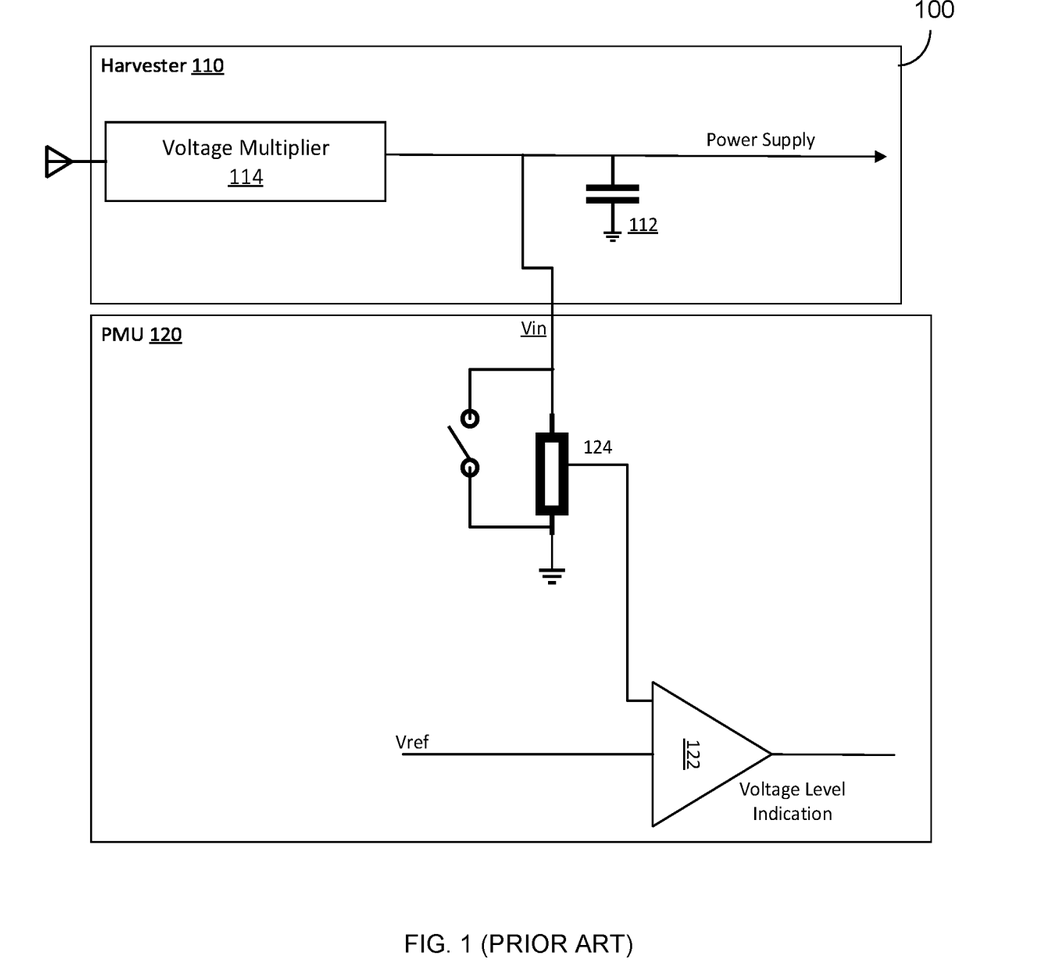
FIG. 1 is a diagram of a conventional harvester system.

FIG. 1 shows a diagram of a conventional harvester system 100 based on a harvester 110. The harvester 110 is coupled to a PMU 120 including a Schmitt trigger 122. The harvester 110 receives RF signals transmitted by external resources. The energy of the received RF signals charges a capacitor 112, where the conversion of energy to current is performed by means of a voltage multiplier 114. A voltage multiplier is an electrical circuit that converts AC electrical power to a DC voltage and cascades its DC outputs to multiply the output voltage level, typically using a network of capacitors and diodes or switches. An example for such a multiplier is a Dickson multiplier.

The PMU 120 determines when the voltage level at the capacitor 112 is sufficient enough so that the harvester system 100 can run computing tasks, and transmit, and/or receive signals. For example, a reference voltage threshold (Vref) is compared to the voltage level (Vin) at the capacitor 112. Once the voltage level Vin is over the threshold (Vref), the Schmitt trigger 122 switches from zero to one, signaling that the harvester 110 device has sufficient power.

A Schmitt trigger 122 is a comparator circuit with a hysteresis 124 implemented by applying positive feedback to the noninverting input of a comparator or differential amplifier. Here, a Schmitt trigger is an active circuit which converts an analog input signal to a digital output signal via a comparator and has a hysteresis. As such, power is required to operate the Schmitt trigger 122. The power is provided by the harvester 110.

Omitting the batteries from IoT devices is of interest because of their cost, size, lack of durability to environmental effects (e.g. water, humidity), and their short lifetime which requires accessibility for replacement. The problem with the harvester's design disclosed in the related art is that, such a harvester only provides a single resource of energy. When no signals are received at the frequency that an antenna of a single harvester is tuned to, often the case no energy is able to be harvested at all. In order to optimize performance, a harvester and antenna should operate at a high-quality factor resonance. Thus, a wide band antenna, may not be applicable.

It would therefore be advantageous to provide a solution that would harvest energy from multiple sources in IoT devices.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a multi-band energy harvesting system. The system comprises a plurality of harvesting antennas, wherein each of the plurality of harvesting antennas operates at a specific frequency band; and a plurality of harvesting units, wherein each of the plurality of harvesting units is coupled to a respective harvesting antenna and adapted to harvest energy at the specific frequency band of the respective harvesting antenna.

Certain embodiments disclosed herein include a battery-free wireless device, comprising: a multi-band energy harvesting system adapted to harvest energy from over-the-air signals transmitted in different frequency bands; and a sensor powered by the harvested energy.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some embodiments use standard radio transmission in the same system. In an example embodiment, a Bluetooth Low Energy may transmit simultaneous to energy harvesting. In another example, some embodiments may operate as part of a duty cycled system, so that transmission and other operations do not rely on simultaneous harvesting. For example, part of the time the antennas may be tuned to receive/transmit and the other part of the time the antenna may be tuned to harvest energy.

Figure 2:
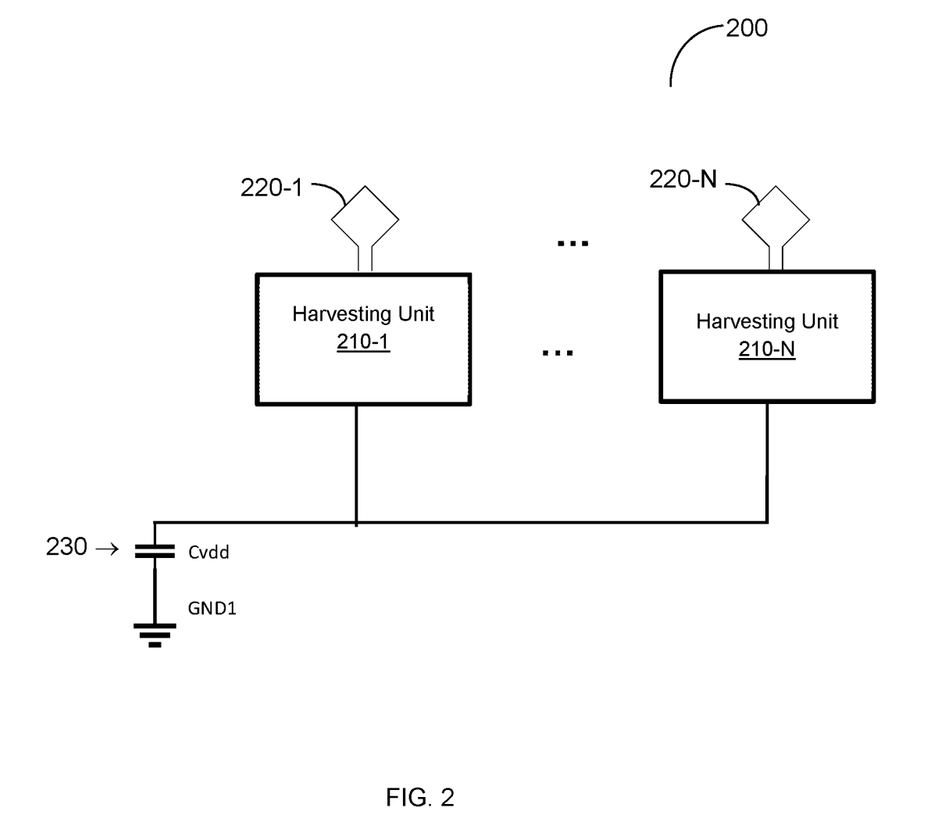
FIG. 2 is a block diagram of a multiband energy harvester according to some embodiments.

FIG. 2 illustrates an example block diagram of a multi-band energy harvester 200 disclosed according to some embodiments. The harvester 200 includes a plurality of band-specific harvesting units 210-1 through 210-N (where N is an integer greater than 1). Each harvesting unit 210-1 through 210-N is respectively coupled to antenna 220-1 through 220-N. The band-specific harvesting units 210-1 through 210-N are referred to individually as a harvesting unit 210 or collectively as harvesting units 210 for simplicity. Further, the antennas 220-1 through 220-N may be referred to individually as an antenna 220 or collectively as antennas 220 for simplicity. Energy harvested by the harvesting units 210 may be stored as an energy storage unit, such as the capacitor 230.

Electromagnetic energy is available from existing wireless signals that exist in the environment of the harvester 200. Such wireless signals may comply with known wireless standards, such as Wi-Fi (IEEE 802.11) which operates at the 2.4 GHz and 5-6 GHz bands, the BLE protocol which operates in the 2.400-2.4835 GHz band, Wi-Gig which operates at the 60 GHz band, cellular signals that comply with cellular standards (such as 2G, 3G, LTE, 4G, 5G, 5G mmWave, and the like), and Industrial, Scientific, and Medical (ISM) frequency band.

As each wireless standard operates at a different frequency and different frequency channels within its allocated band(s), each antenna 220 is designed to receive signals at a specific frequency band. For example, the antenna 220-1 may be designed to receive signals at the BLE band (2.400-2.4835 GHz) and the antenna 220-N may be designed to receive signals at the Wi-Fi 2.4 GHz band. Similarly, the antenna 220-1 may be designed to receive signals at the cellular 1.7-2 GHz bands.

In some embodiments, a number of antennas 220 may be designed to receive signals at the same frequency band. For example, antennas 220-1 and 220-N may operate at 2.4 GHz.

It should be noted that although the antenna 220 is designed to a specific frequency band, the respective harvesting unit 210 should be tuned to a center frequency at which the signal is received. In order to optimize performance, a harvesting unit 210 and a respective antenna 220 should operate at resonance. To this end, in some embodiments, a tuning mechanism (not shown) is included in the harvester 200.

The tuning mechanism may be utilized to tune each or some of the harvesting units 210 to operate at resonance with the frequency of the received harvesting signals. In an embodiment, the tuning mechanism is designed to be activated at very low energy levels, so that the tuning may be initiated immediately.

The harvester 200 may be integrated in an IoT sensor or a wireless IoT chip (not shown). Specifically, the antennas are fabricated or printed on the same substrate (inlay) that carries the wireless IoT chip. The wireless IoT chip typically receives and transmits wireless signals using, for example, the BLE communication standard. In this configuration, one of the antennas 220 may be served as the transmit/receive antenna of the wireless IoT chip. To this end, a duty cycle between harvesting and receiving/transmitting is implemented. That is, transmission and receiving may occur in non-harvesting time periods.

In some embodiments, different signals may be received and/or transmitted according to an assigned duty cycle. For example, the BLE may be turned on and off at various points, or cellular communications. In one example, Wi-Fi may be used for energy harvesting, otherwise BLE may be used or activated. Duty cycle assignments may be based on proximity to a source of BLE transmission. Duty cycle percentage targets may be assigned in any number of ways as described herein.

In certain configurations, a dedicated antenna is utilized as the transmit/receive antenna. Thus, each of the antennas 220 serve for energy harvesting. An example for such a wireless IoT chip implemented with the harvester 200 and a dedicated transmit/receive antenna is provided in FIG. 3.

In some embodiments, each harvesting unit 210 includes a voltage multiplier (not shown) that may be directly coupled to the respective antenna 220 and the energy storage 230. The voltage multiplier is an electrical circuit that converts AC electrical power to a DC voltage and cascades its DC outputs to multiply the output voltage level, typically using a network of capacitors and diodes/switches. In an example embodiment, the voltage multiplier is a Dickson multiplier.

Figure 3:
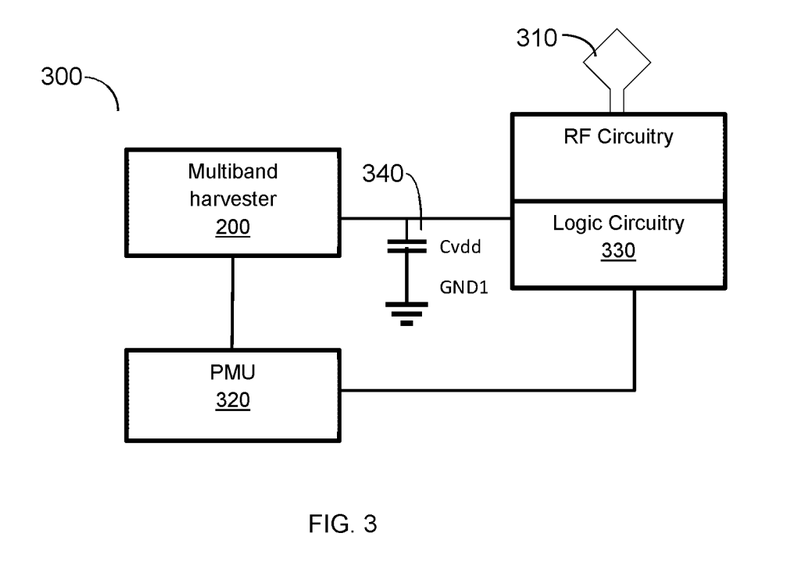
FIG. 3 is a block diagram of a wireless IoT chip with multiband energy harvester according to some embodiments.

FIG. 3 illustrates an example block diagram of a wireless IoT chip 300 implementing a multiband energy harvester 200 according to an embodiment. In this embodiment, the wireless IoT chip 300 includes a transmit/receive antenna 310 that is not utilized for energy harvesting.

The harvester 200 is connected to a power management unit (PMU) 320 coupled to the logic circuitry 330 of the wireless IoT chip 300. The PMU 320 is an electronic circuit that performs general circuit power related operations, such as supply regulation, voltage and current references, power on indication, brown-out indication, power modes control, management of power storage units, and more. The PMU 320 provides a voltage threshold crossing indication based on the measurement of the voltage over an energy storage (e.g., a capacitor) 340.

In an embodiment, the PMU 320 provides multi-level voltage level indications to the logic circuitry 330. These indications allow the logic circuitry 330 to determine the state of a Voltage Supply at any given moment when the energy storage 340 charges or discharges.

In an embodiment, the PMU 320 includes a detection circuitry (not shown) controlled by a controller (not shown). The detection circuitry includes different voltage reference threshold detectors, where, at any given time, only a subset of such detectors are active to perform the detection. The sub-set of detectors to be activated at any given moment is determined by the controller. A detailed description of the PMU 320 designed to provide multi-level voltage indications is disclosed in U.S. Pat. No. 10,658,875 assigned to the common assignee and is hereby incorporated by reference.

The multiband energy harvester 200 includes a plurality of antennas coupled to a plurality of harvesting units as discussed in greater detailed above with reference to FIG. 2.

According to one embodiment, the multiband energy harvester 200 is configured to include two harvesting units connected to antennas that can harvest energy from signals received at the BLE advertisement channels 2.426 GHz channel 38 and 2.48 GHz channel 39. Any subset of 2.402, 2.426 and 2.428 may be used as well. Any combination of 1 to X number of channels, signals and harvested inputs may be used. For example, all of the BLE advertisement channels may be used for harvesting energy. In addition, one or more Wi-Fi channels may be received in combination with the BLE channels. The primary as well as the secondary BLE advertisement channels may be used for harvesting energy.

According to one embodiment, the multiband energy harvester 200 is configured to include three harvesting units connected to antennas that can harvest energy signals received at the BLE frequency band 2.4 GHz, Wi-Fi band 2.4 GHz, and a Wi-Fi band 5 GHz. In another embodiment, energy from signals transmitted by the BLE 5.0 may be harvested including one or more advertisement channels. In yet another embodiment, BLE 5.0 signals may be harvested as well as one or more cellular bands in addition to one or more Wi-Fi bands. The BLE 5.0 is the latest version of the BLE wireless communication.

In another embodiment multiband energy harvester 200 may be configured to include a transmit/receive antenna, a 2.4 GHz antenna, a 1.8 GHz (PCS cellular band) antenna and an ultra-short range 2.4 GHz harvesting antenna, which may be used for manufacturing high power consumption NVM burn.

It should be noted that the wireless IoT chip discussed herein may include one or more sensors. Examples for such sensors include, but are not limited to, temperature, humidity, weight, oxygen, CO2, pressure, location, bio-feedback, water, acoustic, light, and so on. In some configurations, the IoT chip may not include a sensor.

Figure 4:
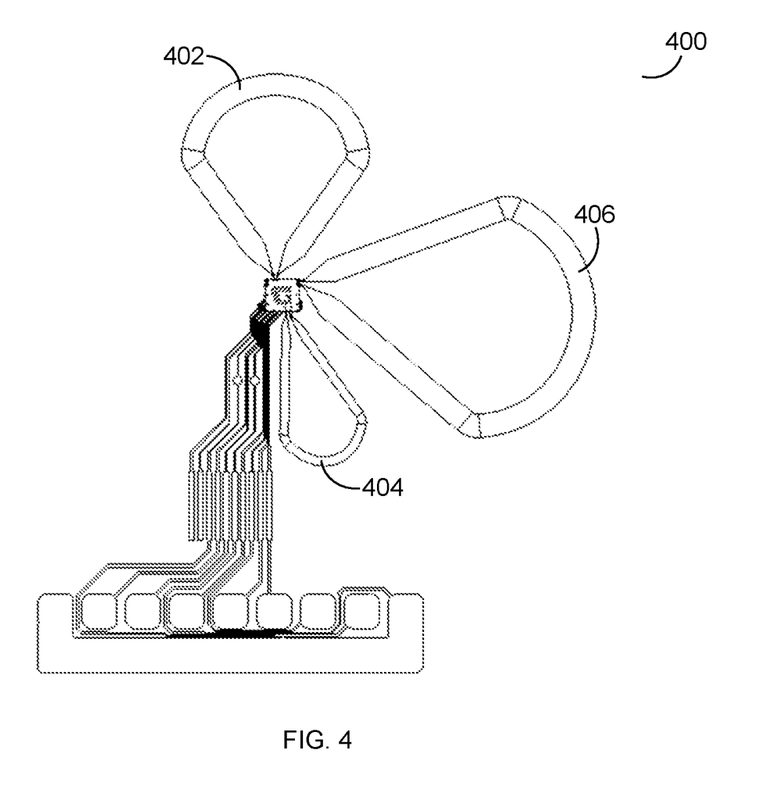
FIG. 4 is a diagram of a multi-band energy harvester designed according to one embodiment.

FIG. 4 illustrates an example diagram 400 illustrating the antennas of a multi-band energy harvester designed according to one embodiment. Specifically, FIG. 4 illustrates 3 antennas 402, 404, and 406. In the example arrangement, the antenna 402 is a 2.44 GHz centered transmitter antenna. The antenna 406 is a 2.402 GHz centered antenna. Similarly, the antenna 404 is a 5.2 GHz Wi-Fi antenna. Thus, in the arrangement shown in FIG. 4, the antennas 404 and 406 are utilized for energy harvesting while the antenna 402 is utilized for receiving and transmitting signals.

Figure 5:
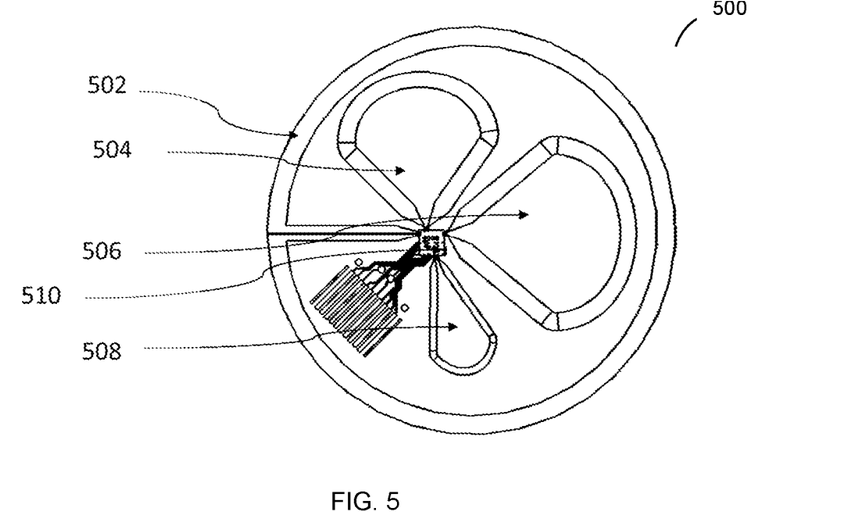
FIG. 5 is a diagram of a multi-band energy harvester designed according to another embodiment.

FIG. 5 illustrates an example diagram 500 of a multi-band energy harvester designed according to another embodiment. As shown in FIG. 5, the design includes antennas 502, 504, 506, and 508. The antenna 502 is a sub-GHz loop antenna which encircles the rest of the structures for compactness and other higher frequency loop antennas. In an embodiment, the antenna 502 operates at the cellular frequency band of 710 MHz and is utilized for energy harvesting. It should be noted that the antenna 502 can be designed to operate in another cellular band or for RFID frequencies.

The antenna 506 also operates in the 1850 MHz cellular band and is utilized for energy harvesting. The antenna 504 is a 2450 MHz loop antenna serving as a receive/transmit antenna. The antenna 508 is a 2450 MHz antenna loop antenna utilized for energy harvesting dedicated for high incoming RF power levels used during non-volatile memory (flash) programming. The antennas 504 and 508 operate in the ISM band. FIG. 5 further illustrates electronic circuits of the IoT chip 510. It should be noted that the energy for the programming of the non-volatile memory can be harvested through other frequencies, not just in the 2450 MHz band.

The dimension of each harvesting and/or transmit/receive antennas (such as the antennas discussed with reference to FIGS. 4-5) is determined in such way that the center frequency of the antenna resonates with the electronic circuits of the IoT chip. In an embodiment, each antenna is designed in such way that inductive elements of the antenna together with capacitive elements of the chip would resonate. Specifically, in an embodiment, electrically small loop-antennas are used as the antenna elements. These antenna types inherit an inductive input impedance. The capacitive elements also include parasitic capacitance of the circuits. An electrically small loop antenna may comprise electrically small and large antennas. Typically, electrically small antennas having overall circumference approaches of wavelength/5 or smaller, while electrically large loop antennas are those with a circumference of about free space wavelength.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A multi-band energy harvesting system, comprising:
a plurality of harvesting antennas, wherein each of the plurality of harvesting antennas operates at a specific frequency band; and
a plurality of harvesting units, wherein each of the plurality of harvesting units is coupled to a respective harvesting antenna and adapted to harvest energy in the far field of the specific frequency band of the respective harvesting antenna;
wherein the center frequency of at least one of the harvesting antennas resonates with at least one electronic circuit of an integrated circuit to which the multi-band energy harvesting system is coupled, wherein the at least one of the harvesting antennas is a loop antenna having an inductive impedance that is matched so as to resonate with capacitive elements of the integrated circuit at the center frequency, the at least one of the harvesting antennas being directly connected to the at least one electronic circuit of the integrated circuit.

2. The multi-band energy harvesting system of claim 1, further comprising:
a power management circuit; and
a capacitor for storing the harvested energy.

3. The multi-band energy harvesting system of claim 1, wherein the harvested energy is utilized to power a wireless chip.

4. The multi-band energy harvesting system of claim 1, wherein an antenna of the plurality of harvesting antennas is a centered antenna.

5. The multi-band energy harvesting system of claim 1, wherein the specific frequency band of each of the plurality of antennas is any one of: a Bluetooth low energy (BLE) advertising channel frequency band, an Industrial, Scientific, and Medical (ISM) frequency band, a cellular commutation frequency band, a Wi-Fi frequency band, and a Wi-Gig frequency band.

6. The multi-band energy harvesting system of claim 1, wherein the plurality of harvesting antennas includes at least: a first harvesting antenna operates at a Wi-Fi frequency band and a second harvesting antenna operates at a BLE frequency band.

7. The multi-band energy harvesting system of claim 1, wherein the plurality of harvesting antennas includes at least: a first harvesting antenna operates at a first cellular communication frequency band, a second harvesting antenna operates at a second cellular communication frequency band, and a third harvesting antenna operates at the 2.4 GHz ISM frequency band.

8. The multi-band energy harvesting system of claim 1, wherein at least one of the harvesting antennas is configured to transmit and receive communication signals.

9. The multi-band energy harvesting system of claim 1, wherein each of the harvesting units includes a voltage multiplier coupled to the respective harvesting antenna and configured to harvest energy from over-the-air signals.

10. The multi-band energy harvesting system of claim 1, wherein at least one of the harvesting antennas other than the loop antenna is configured such that at least one inductive element of the at least one of the harvesting antennas resonates in combination with at least one capacitive element of the integrated circuit.

11. A battery-free wireless device, comprising:
a multi-band energy harvesting system adapted to harvest energy from over-the-air signals transmitted in different frequency bands; and
a sensor powered by the harvested energy
wherein the multi-band energy harvesting system comprises:
a plurality of harvesting antennas, wherein each of the plurality of harvesting antennas operates to receive wireless signals in the far field of a specific frequency band; and
wherein the center frequency of at least one of the harvesting antennas resonates with at least one electronic circuit of an integrated circuit to which the multi-band energy harvesting system is coupled, wherein the at least one of the harvesting antennas is a loop antenna having an inductive impedance that is matched so as to resonate with capacitive elements of the integrated circuit at the center frequency, the at least one of the harvesting antennas being directly connected to the at least one electronic circuit of the integrated circuit.

12. The battery-free wireless device of claim 11, wherein the multi-band energy harvesting system further comprises:
a plurality of harvesting units, wherein each of the plurality of harvesting units is coupled to a respective harvesting antenna and adapted to harvest energy at the specific frequency band of the respective harvesting antenna;
a power management circuit; and
a capacitor for storing energy the harvested energy.

13. The battery-free wireless device of claim 12, wherein each of the harvesting units includes a voltage multiplier coupled to the respective harvesting antenna and configured to harvest energy from the over-the-air signals.

14. The battery-free wireless device of claim 11, wherein an antenna of the plurality of harvesting antennas a centered antenna.

15. The battery-free wireless device of claim 11, wherein the at least one of the harvesting antennas is configured such that at least one inductive element of the at least one of the harvesting antennas resonates in combination with at least one capacitive element of the integrated circuit.

16. The battery-free wireless device of claim 11, wherein the plurality of harvesting antennas includes at least: a first harvesting antenna operates at a Wi-Fi frequency band and a second harvesting antenna operates at a BLE frequency band.

17. The battery-free wireless device of claim 11, wherein the plurality of harvesting antennas are fabricated a same substrate carrying the battery-free wireless device.

18. The battery-free wireless device of claim 11, wherein the plurality of harvesting antennas is utilized for programming a non-volatile memory.

19. A multi-band energy harvesting system, comprising:
a plurality of harvesting antennas, wherein each of the plurality of harvesting antennas operates at a specific frequency band;
a plurality of harvesting units, wherein each of the plurality of harvesting units is coupled to a respective harvesting antenna and adapted to harvest energy in the far field of the specific frequency band of the respective harvesting antenna;

a plurality of detectors, wherein each of the plurality of detectors are configured with a different reference threshold voltage level; and a controller coupled to the plurality of detectors and configured to activate a subset of the plurality of detectors at any given time, wherein a subset of the plurality of detectors, when activated, are configured to provide a multi-level voltage level indication on a state of a voltage supply;

wherein the center frequency of at least one of the harvesting antennas resonates with at least one electronic circuit of an integrated circuit to which the multi-band energy harvesting system is coupled, wherein the at least one of the harvesting antennas is a loop antenna having an inductive impedance that is matched so as to resonate with capacitive elements of the integrated circuit at the center frequency, the at least one of the harvesting antennas being directly connected to the at least one electronic circuit of the integrated circuit.

* * * * *